United States Patent
Rahardjo et al.

(10) Patent No.: US 11,243,592 B2
(45) Date of Patent: Feb. 8, 2022

(54) SYSTEM AND METHOD FOR CONTROLLING A POWER-ON SEQUENCE AND POWER THROTTLING USING POWER BRAKE

(71) Applicant: DELL PRODUCTS, LP, Round Rock, TX (US)

(72) Inventors: Johan Rahardjo, Austin, TX (US); Jeremiah James Bartlett, Austin, TX (US); Joshua David Anderson, Round Rock, TX (US); Isaac Qin Wang, Austin, TX (US); Duk M. Kim, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 215 days.

(21) Appl. No.: 16/542,080

(22) Filed: Aug. 15, 2019

(65) Prior Publication Data
US 2021/0048863 A1    Feb. 18, 2021

(51) Int. Cl.
| G06F 1/26 | (2006.01) |
| G06F 9/4401 | (2018.01) |
| G06F 1/324 | (2019.01) |

(52) U.S. Cl.
CPC ............... *G06F 1/266* (2013.01); *G06F 1/26* (2013.01); *G06F 1/324* (2013.01); *G06F 9/4401* (2013.01); *G06F 9/4403* (2013.01)

(58) Field of Classification Search
CPC .......... G06F 1/324; G06F 1/26; G06F 9/4401; G06F 1/266; G06F 9/4403

USPC .............................. 713/1, 322, 330; 323/908
See application file for complete search history.

(56) References Cited

U.S. PATENT DOCUMENTS

| 6,968,465 B2* | 11/2005 | Freevol | H02H 9/001 |
| | | | 713/300 |
| 9,195,299 B2* | 11/2015 | Alshinnawi | G06F 1/3287 |
| 9,474,181 B2 | 10/2016 | Bailey et al. | |
| 9,625,974 B2 | 4/2017 | Bailey et al. | |
| 9,753,520 B2 | 9/2017 | Bailey et al. | |
| 2003/0105984 A1* | 6/2003 | Masuyama | G06F 1/26 |
| | | | 713/330 |
| 2013/0049466 A1* | 2/2013 | Adams | G06F 1/266 |
| | | | 307/39 |
| 2015/0177813 A1 | 6/2015 | Bailey et al. | |
| 2015/0370296 A1* | 12/2015 | Purcell | G06F 11/221 |
| | | | 714/43 |
| 2015/0372462 A1 | 12/2015 | Mills et al. | |

(Continued)

*Primary Examiner* — Ji H Bae
(74) *Attorney, Agent, or Firm* — Larson Newman, LLP

(57) ABSTRACT

An information handling system includes a controller and first, second and third devices. The devices power-on during a power-on sequence of the information handling system. During the power-on sequence, the controller provides a first power brake signal to the first device via a first power brake line, a second power brake signal to the second device via a second power brake line, and a third power brake signal to the third device via a third power brake line. The controller removes the first power brake signal from the first power brake line. In response to an expiration of a first amount of time, the controller removes the second power brake signal from the second power brake line. In response to an expiration of a second amount of time, the controller removes the third power brake signal from the third power brake line.

18 Claims, 11 Drawing Sheets

(56) References Cited

U.S. PATENT DOCUMENTS

2018/0095510 A1* 4/2018 Tsao ................. G06F 1/325
2019/0052254 A1* 2/2019 Hess .............. H03K 19/017509

* cited by examiner

SYSTEM AND METHOD FOR CONTROLLING A POWER-ON SEQUENCE AND POWER THROTTLING USING POWER BRAKE

FIELD OF THE DISCLOSURE

The present disclosure generally relates to information handling systems, and more particularly relates to controlling a power-on sequence and power throttling using power brake.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

First, second and third devices may power-on during a power-on sequence of an information handling system. During the power-on sequence of the information handling system, a controller may provide a first power brake signal to the first device via a first power brake line, a second power brake signal to the second device via a second power brake line, and a third power brake signal to the third device via a third power brake line. The controller may remove the first power brake signal from the first power brake line to enable the first device to power-on. In response to an expiration of a first amount of time, the controller may remove the second power brake signal from the second power brake line to enable the second device to power-on. In response to an expiration of a second amount of time, the controller may remove the third power brake signal from the third power brake line to enable the third device to power-on.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
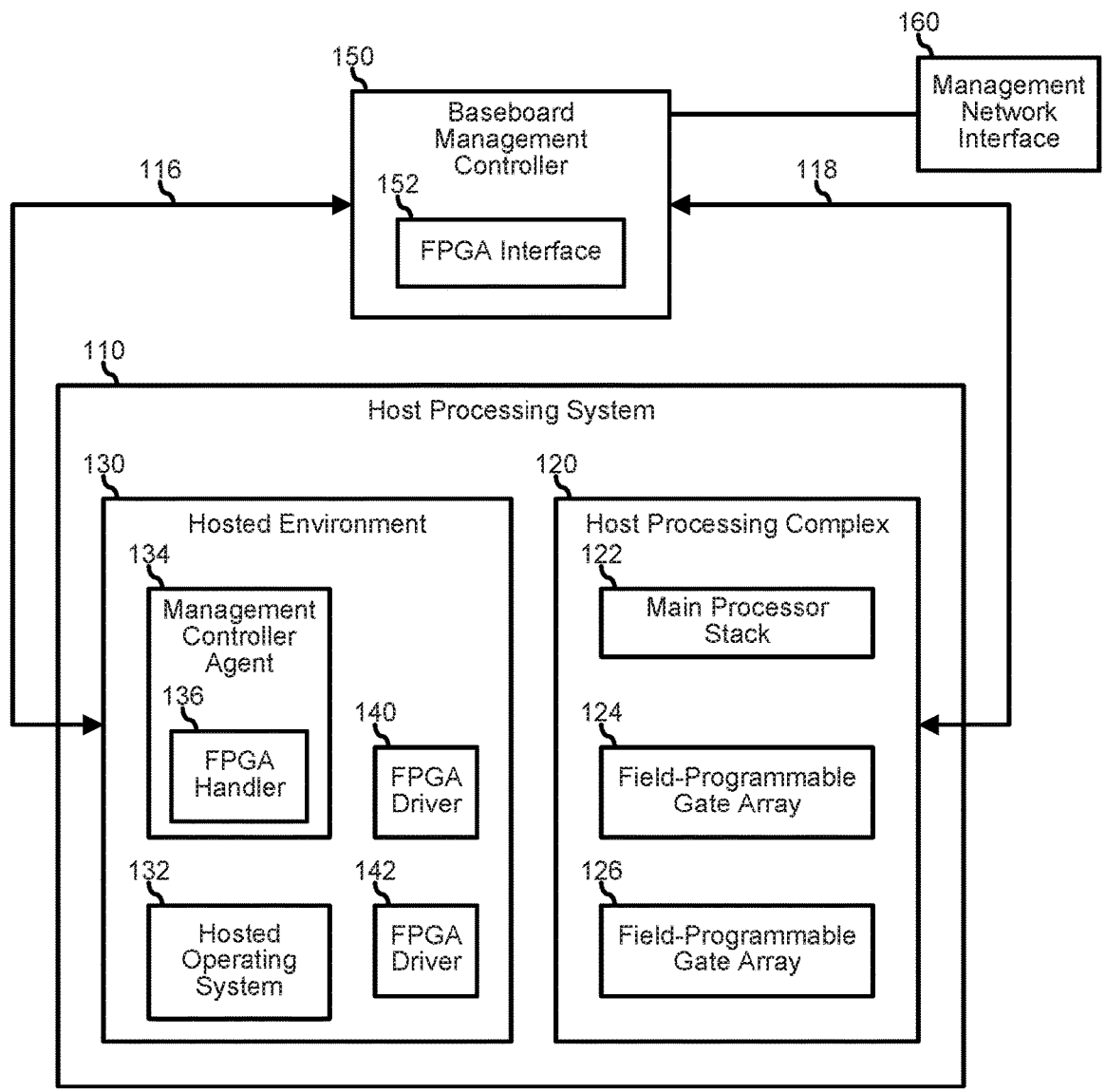
FIG. 1 is a block diagram of an information handling system according to an embodiment of the present disclosure.

FIG. 1 illustrates an information handling system 100 including a host processing system 110, a baseboard management controller (BMC) 150, and a management network interface 160. Host processing system 110 includes a host processing complex 120 and a hosted environment 130. Host processing complex 120 represents the main processing elements of information handling system 100, including a main processor stack 122, and field-programmable gate arrays (FPGAs) 124 and 126. Main processor stack 122 represents hardware including one or more processors, chipset elements, storage devices, memory devices, I/O devices, and the like. FPGAs 124 and 126 represent processing resources of host processing complex 120 that can be utilized to offload main processor stack 122 from various functions as needed or desired.

Hosted environment 130 includes a hosted OS 132, a BMC agent 134, and FPGA drivers 140 and 142. Hosted environment 130 represents a processing environment instantiated in code on host processing complex 120, and can include a BIOS or UEFI for information handling system 100, other firmware, device drivers, and the like, that establish the core operating code for establishing the hosted environment, and to launch hosted OS 132 on the host processing complex. Hosted OS 132 operates to manage the runtime aspects of hosted environment 130, to launch programs and applications on host processing complex 120, and to launch, manage, maintain, and halt tasks on FPGAs 124 and 126. FPGA drivers 140 and 142 operate to control FPGAs 124 and 126, and to provide an interface to enable hosted OS 132 and other components of hosted environment 130 to access the FPGAs. In a particular embodiment, one or more of FPGAs 124 and 126 include vendor specific functions and features for configuring, monitoring, and controlling the FPGAs. Such vendor specific functions and features are accessible to hosted environment 130 via FPGA drivers 140 and 142.

BMC 150 is connected via an interface 116 to interact with various functions and features of hosted environment 130, and is connected via an out-of-band interface 118 to interact with various functions and features of host processing complex 120. In particular, BMC 150 interacts with the various functions and features of hosted environment 130 via a management system agent 134 that is instantiated in the hosted environment to permit a user connected to the BMC to obtain status information from the pre-boot and runtime elements of the hosted environment, including the programs and applications instantiated in the hosted environment. The user can also provide commands and otherwise control the operations of the programs and applications, including directing hosted OS 132 to launch a program, application, or task, to modify the runtime operation of a program, application, or task, and to halt the execution of a program, application, or task, as needed or desired. Interface 116 represents a communication path between hosted environment 130 and BMC 150, as is known in the art, and can include a keyboard controller style (KCS) interface, a USB-NIC interface, an OS-to-BMC pass-through interface, or the like.

BMC 150 includes an FPGA interface module 152 that interacts with the various in-band functions and features of FPGA drivers 140 and 142 via an FPGA handler module 136 of management system agent 134 to permit the user to obtain status information from the tasks instantiated on FPGAs 124 and 126, and to access the in-band monitoring features of the FPGAs. FPGA interface module 152, interacting with FPGA handler module 136 also permits the user to provide commands and otherwise control the operations of FPGAs 124 and 126 or to manage the tasks running on the FPGAs, including directing hosted OS 132 to launch a task, to modify the runtime operation of a task, and to halt the execution of a task, as needed or desired.

BMC 150 also interacts out-of-band with the various functions and features of host processing complex 120. In particular, FPGA interface module 152 interacts out-of-band with FPGAs 124 and 126. For example, FPGA interface module 152 can receive out-of-band status information from FPGAs 124 and 126. Note that the status information that is available from FPGAs 124 and 126 via out-of-band interface 118 may be the same as, or different from the status information that is available from FPGA drivers 140 and 142, as may be determined by the particular FPGA vendor, or as otherwise dictated by design related choices, as needed or desired.

FPGA interface module 152 provides a management interface that permits a user that is connected to BMC 150 via management network interface 160 to select one or more of FPGAs 124 and 126, and to view the current operating status of the selected FPGA, such as by identifying the tasks currently being run on the selected FPGA, or the like, or by otherwise displaying information related to the status of the selected FPGA. Here, FPGA interface module 152 directs FPGA handler module 136 to retrieve the requested information from hosted environment 130, from hosted OS 132, or directly retrieves the requested information from the selected one of FPGAs 124 and 126 via out-of-band interface 118. FPGA interface module 152 then provides the retrieved information to the user.

Figure 2:
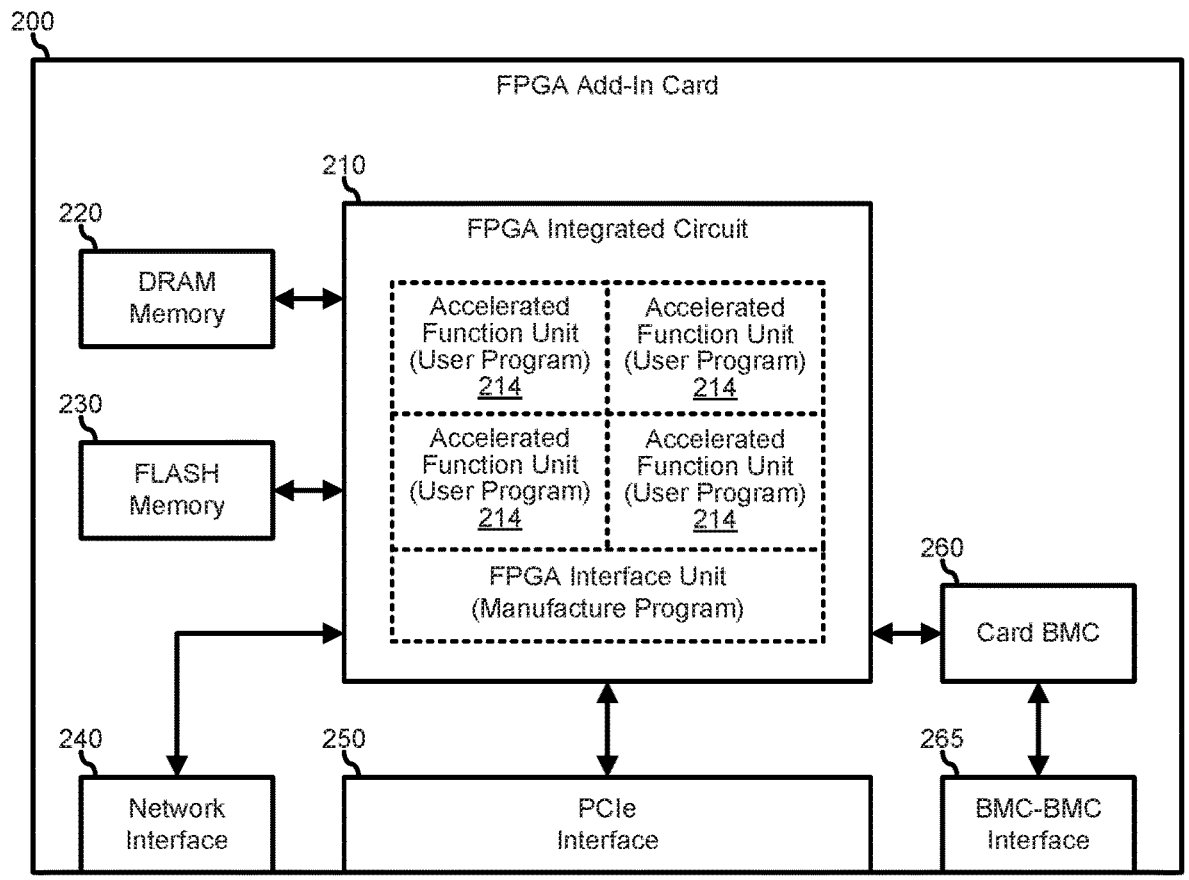
FIG. 2 is a block diagram detailing application and software level components of the information handling system of FIG. 1 according to at least one embodiment of the disclosure.

FPGAs are increasingly being utilized as high-performance accelerators in various server applications, where a typical server may employ one or more FPGAs. FIG. 2 illustrates an FPGA add-in card 200 that can be plugged into a communication interface of a server system. FPGA add-in card 200 includes an FPGA integrated circuit 210, one or more Dynamic Random Access Memory (DRAM) device 220, one or more FLASH memory device 230, a network interface 240, a PCIe interface 250, a card BMC 260, and a BMC-to-BMC interface 265. FPGA add-in card 200 provides the functions and features of an FPGA, but packaged so as to be easily incorporated into the architecture of an information handling system. FPGA integrated circuit 210 represents an FPGA device that is configured to provide hardware acceleration for various types of processing task and that is flexible to be configured to perform its intended processing tasks.

DRAM memory device 220 represents a volatile memory device that is accessible for storage of data to be consumed by, or produced by FPGA integrated circuit 210 or other functions of FPGA add-in card 200. Flash memory device 230 represents a non-volatile memory device for storing firmware for FPGA add-in card 200 and for storing other configuration information related to the FPGA add-in card. Network interface 240 represents a port for connecting to a network external to the information handling system into which FPGA add-in card 200 is installed. An example includes an Ethernet network, a Fibre Channel network, or another network, as needed or desired. In a particular embodiment, network interface 240 represents one or more Quad Small Form-Factor Pluggable (QSFP) modules. PCIe interface 250 represents a high-speed serial data interface in accordance with a PCIe specification. An example of PCIe interface 250 includes a four-lane (×4) link, an eight-lane (×8) link, a 16-lane (×16) link, or a link with another number of lanes as needed or desired. PCIe interface 250 represent a main data communication link between FPGA add-in card 200 and the information handling system into which the FPGA add-in card is installed for interacting with the programs and software instantiated in an operating system of the information handling system to perform the processing tasks as described below. Card BMC 260 represents a processor or controller of FPGA add-in card 200 for the monitoring, management, and maintenance of the functions and features of the FPGA add-in card. Card BMC 260 can operate in accordance with an Intelligent Platform Management Interface (IPMI) to provide the monitoring, managing, and maintaining of the functions and features out-of-band from an operating system instantiated on an information handling system into which FPGA add-in card 200 is installed. Here, card BMC 260 will typically be part of a management network of the information handling system that includes a BMC for the information handling system. Hence card BMC 260 will be connected to the system BMC via BMC-to-BMC interface 265. Thus BMC-to-BMC interface 265 operates to couple card BMC 260 to a management network of the information handling system for out-of-band communication between the card BMC and the elements of the information handling system. Examples of a management network interface may include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on the information handling system, that is apart from the execution of code by processors of the information handling system and procedures that are implemented on the information handling system in response to the executed code.

FPGA integrated circuit 210 executes FPGA Interface Unit (FIU) program 212, which is provided by the manufacturer of the FPGA integrated circuit of FPGA add-in card 200 and one or more Accelerated Function Unit (AFU) 214, which is provided by a user of the information handling system into which FPGA add-in card 200 is installed. The FIU 212; also referred to as the "Blue Bit Stream" where FPGA add-in card 200 represents an FPGA add-in card manufactured by Intel Corp.; provides a platform interface layer between FPGA integrated circuit 210 and the other interfaces of FPGA add-in card 200, such as DRAM device 220, FLASH memory device 230, network interface 240, PCIe interface 250, and card BMC 260. The AFUs, also referred to as the "Green Bit Streams" where FPGA add-in card 200 represents an FPGA add-in card manufactured by Intel Corp., provide the user intellectual property (IP) that uniquely programs FPGA integrated circuit 210 to perform the intended processing tasks. The FIU 212 is pre-configured at the time of manufacture, and, with the exception of periodic firmware updates from the manufacturer of FPGA add-in card 200, is intended to stay unchanged during the life of the FPGA add-in card. On the other hand, the AFUs 214 are meant to be programmed in accordance with the desired processing task to be performed by FPGA add-in card 200. Hence FPGAs are referred to as being "field programmable." In this regard, the AFUs 214 may be programmed to FPGA during a system boot process of the information handling system into which FPGA add-in card 200 is installed, or during run time on an operating system instantiated on the information handling system, and FPGA integrated circuit 210 can be reprogrammed with different AFUs as needed or desired during the run time.

Figure 3:
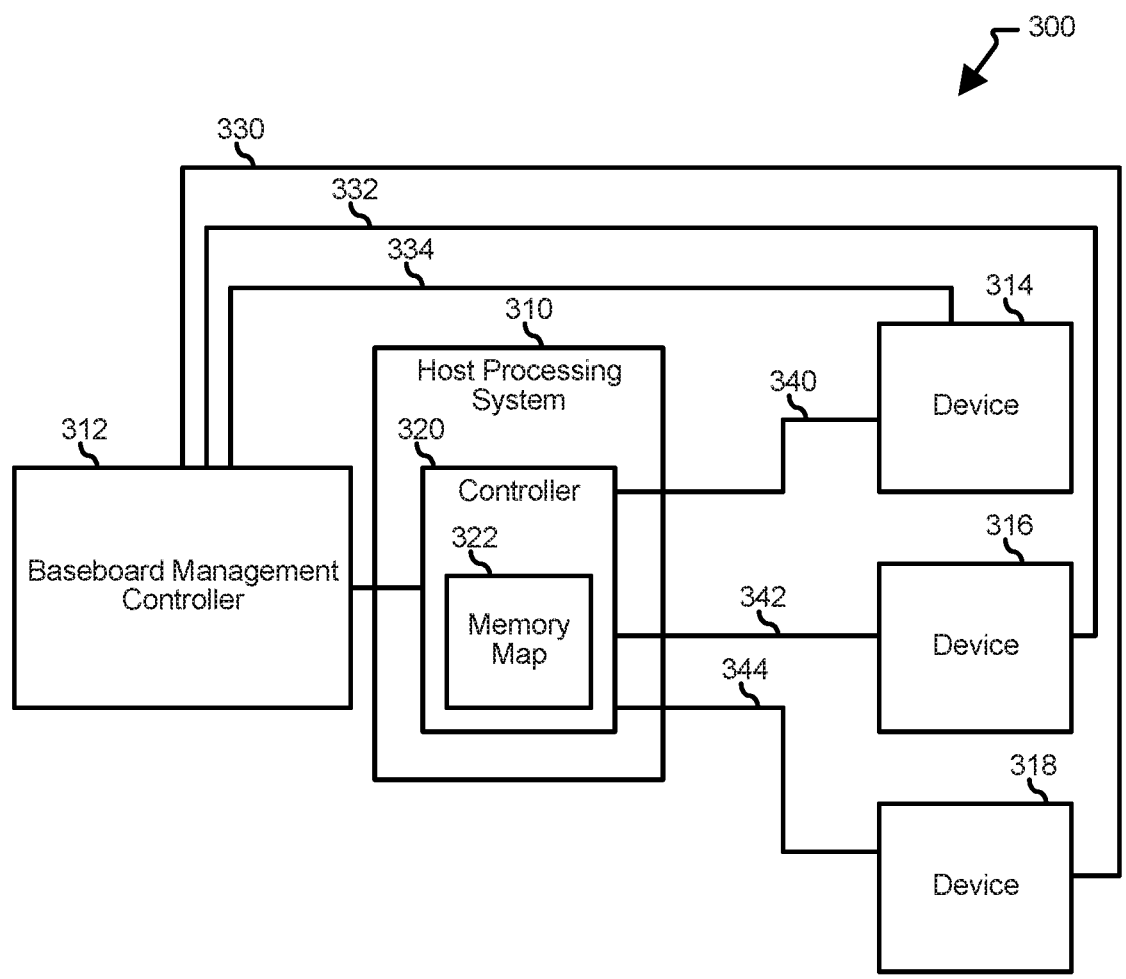
FIG. 3 is a block diagram of a portion of an information handling system according to at least one embodiment of the disclosure.

FIG. 3 is a block diagram of a portion of an information handling system 300 including a host processing system 310, a baseboard management controller (BMC) 312, and devices 314, 316, and 318 according to at least one embodiment of the disclosure. Host processing system 310 includes a controller 320, which in turn may store a memory map 322 within a computer memory, such as computer memory 1104 of FIG. 11. In an example, BMC 312 may be any suitable type of controller, such as a BMC in accordance with an IPMI specification, an Integrated Dell Remote Access Controller (iDRAC), or the like. In an example, controller 320 may be any suitable component to control a power-on sequence of one or more devices, such as devices 314, 316, and 318, within information handling system 300. For example, controller 320 may be a complex programmable logic device (CPLD).

In an example, controller 320 may control the power-on sequence for any suitable device including, but not limited to, a network interface card (NIC), a graphics processing unit (GPU), a PCIe device, and a FGPA accelerator. In an example, devices 314, 316, and 318 may be, or may be substantially similar to, FPGAs 124 and 126 of FIG. 1 and a third FGA card or FPGA add-in card 200 of FIG. 2 and second and third FPGA add-in cards. Information handling system 300 may include additional components (not shown in FIG. 3), without varying from the scope of this disclosure. For example, information handling system 300 may include additional or fewer devices to power on without varying from the scope of this disclosure. Additionally, in an example, information handling system 300 may be incorporated within information handling system 100 of FIG. 1, such that controller 320 may power up the FPGAs 124 and 126 of FIG. 1.

During a power-on sequence, an inrush/spike current may be induced when a main voltage rail is enabled within information handling system 300. This inrush current often happens when an information handling system, such as a server system, goes through a power state transition like that from S5 to S0. In an embodiment, the amount of inrush current depends on the number of devices being powered on. For example, the more components and devices, the higher the inrush current. Power hungry devices like NICs, GPUs and FPGA accelerators, when turned on at the same time, may sink a very large current in a short amount of time and may potentially cause unwanted over-current events and result in a system shutdown. Thus, BMC 312 and controller 322 may utilize memory map 322 and one or more power brake signals to improve the information handling system by optimizing the power-on sequence. In an embodiment, the power-on sequence is optimized based on preventing an inrush/spike current from causing a power limit of the information handling system from being exceeded.

During a power-on sequence of information handling system 300, controller 320 may provide power brake signals to devices 314, 316, and 318 via respective power brake lines 340, 342, and 344. In an example, the power brake signals may enable power gating within device 314, 316, and 318, such that the devices are not provided power at the beginning of the power-on sequence.

While devices 314, 316, and 318 receive the power brake signals, BMC 312 may perform one or more operations to optimize the power-on sequence of the devices within information handling system 300. For example, BMC 312 may perform an inventory of components, such as devices 314, 316, and 318, within information handling system 300. In an example, BMC 312 can receive out-of-band status information from devices 314, 316, and 318 via respective communication buses 334, 332, and 330. The received information from device 314, 316, and 318, may include an in-rush requirement, such as a maximum in-rush power level and a final power level, for each device during a power-on sequence of the device, and may indicate whether each of the devices may utilize the power brake signal as both a power gating signal during the power-on sequence and a power throttling signal during normal runtime operation of information handling system 300.

Based on the received information, BMC 312 may determine which, if any, of devices 314, 316, and 318 are high inrush power devices. In an example, a high inrush power device may be any device that when powered on has an in-rush/spike current that exceeds a predetermined threshold. In certain examples, the predetermined threshold may be set such that multiple devices with an in-rush current that exceeds the predetermined threshold may be powered on at substantially the same time before a maximum power limit/capacity of information handling system 300 is exceeded. In an example, based on the received information, BMC 312 may determine that device 316 is a low inrush power device, and that devices 314 and 318 are high inrush power devices. Additionally, BMC 312 may determine that the maximum in-rush power level of device 314 is greater than the maximum in-rush power level of device 318.

In an embodiment, if all devices 314, 316, and 318 are powered on at substantially the same time, the in-rush current drawn by the devices may cause a total amount of power drawn by the devices to exceed the maximum power limit for information handling system 300, which results in the shutdown of the information handling system. Thus, BMC 312 may improve information handling system 300, by controlling the power-on sequence of devices 314, 316, and 318 so that the maximum power limit of the information handling system is not exceeded during the power-on sequence.

In response to determining the in-rush power levels for devices 314, 316, and 318, BMC 312 may control a power-on sequence of the devices in any suitable manner. For example, BMC 312 may cause controller 320 to first power on the low inrush power device 316, and then individually power on the high inrush power devices 314 and 318. In an example, BMC 312 may create a memory map 322 to control the power-on sequence of the devices 314, 316, and 318. For example, BMC 312 may store in memory map 322 that device 316 may be powered on first and that it may take a particular amount of time for the device to fully power-on. Then upon expiration of the particular amount of time associated within device 316, memory map 322 may indicate that device 318 may be powered on and that it may take another particular amount of time for this device to fully power-on. Then upon expiration of the particular amount of time associated with device 318, memory map 322 may indicate that device 314 may be powered on. In an example, the power-on sequence of memory map 322 may minimize a power up window of devices 314, 316, and 318, such that the maximum power limit of information handling system 300 is not exceeded. In an embodiment, controller 320 utilizes memory map 322 to provide power brake signals to devices 314, 316, and 318 on a one-to-one basis. For example, based on memory map 322, controller 320 may first release the power brake signal on power brake line 342 to enable device 316 to be powered on, then release the power brake signal on power brake line 344 to enable device 318 to be powered on, and then release the power brake signal on power brake line 340 to enable device 314 to be powered on. The in-rush power usage of devices 314, 316, and 318 during two different power-on sequences will be described with respect to FIG. 4 and the components of FIG. 3.

Figure 4:
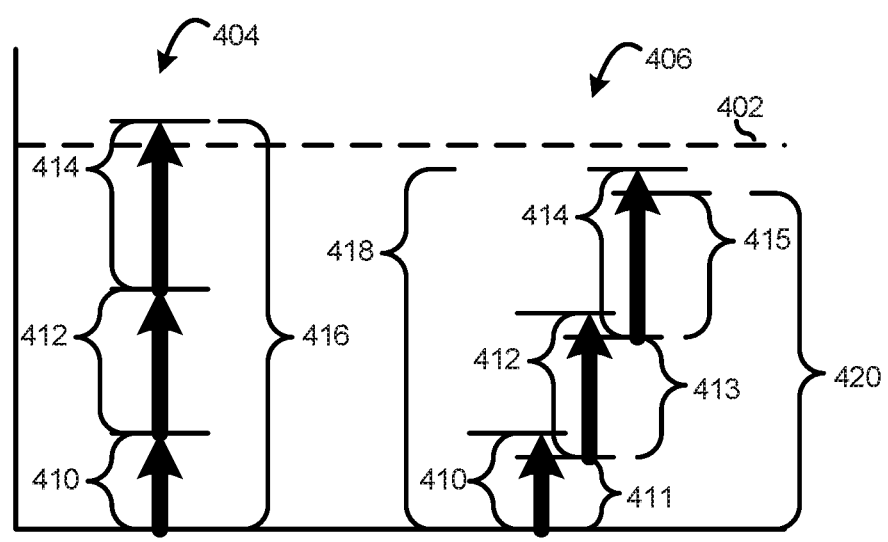
FIG. 4 is a diagram showing a group of signals associated with power levels of devices with respect to a maximum power limit of the information handling system of FIG. 3 during first and second power-on sequences according to at least one embodiment of the disclosure.

FIG. 4 is a diagram showing a group of signals associated with in-rush power levels of devices 314, 316, and 318 with respect to a maximum power limit 402 of information handling system 300 during a first power-on sequence 404 and a second power-on sequence 406 according to at least one embodiment of the disclosure. In an example, device 316 may have a maximum in-rush power level 410 that the device draws in response to the in-rush current during the power-on sequence, and may also have a final power level 411 that the power level of the device settles at the end of the power-on sequence for the device. Similarly, device 318 may have a maximum in-rush power level 412 that the device draws in response to the in-rush current during the power-on sequence, and may also have a final power level 413 that the power level of the device settles at the end of the power-on sequence for the device. Also, device 314 may have a maximum in-rush power level 414 that the device draws in response to the in-rush current during the power-on sequence, and may also have a final power level 415 that the power level of the device settles at the end of the power-on sequence for the device.

In an example, power-on sequence 404 of devices 314, 316, and 318 may be a power-on sequence that is not controlled by memory map 322 of FIG. 3. Instead, during power-on sequence 404, all devices 314, 316, and 318 may be powered on at substantially the same time. Thus, during power-on sequence 404 a total amount of power 416 drawn by devices 314, 316, and 318 is the combination of respective in-rush power levels 414, 410, and 412. In this example, during power-on sequence 404, total amount of power 416 may exceed maximum power limit 402 of information handling system 300, such that the power-on sequence may cause a shutdown of the information handling system.

In an example, power-on sequence 406 of devices 314, 316, and 318 may be a power-on sequence that is controlled by memory map 322 of FIG. 3. During power-on sequence 406, devices 314, 316, and 318 may be individually powered on in response to their respective power brake signal being released. For example, the power brake signal for device 316 may be released, which in turn may cause the device to first draw maximum in-rush power level 410 based on the in-rush current of the device, and then the device may draw the final power level 411. Memory map 322 may include data indicating an amount of time for device 316 to settle at final power level 411, such that controller 320 may not release the power brake signal for device 318 until device 316 is at the final power level. In response to the expiration of the amount of time for device 316, the power brake signal for device 318 may be released, which in turn may cause the device to first draw maximum in-rush power level 412 based on the in-rush current of the device, and then the device may draw the final power level 413. Memory map 322 may include data indicating an amount of time for device 318 to settle at final power level 413, such that controller 320 may not release the power brake signal for device 314 until device 318 is at the final power level. In response to the expiration of the amount of time for device 318, the power brake signal for device 314 may be released, which in turn may cause the device to first draw maximum in-rush power level 414 based on the in-rush current of the device, and then the device may draw the final power level 415. In an example, the final power levels 411, 413, and 415 are the power levels for respective devices 316, 318, and 314 during normal operations.

Thus, during power-on sequence 406 a total amount of power 418 drawn by devices 314, 316, and 318 may be the combination of final power levels 411 and 413, and maximum in-rush power level 414. Additionally, during power-on sequence 406 a final amount of power 420 drawn by devices 314, 316, and 318 may be the combination of final power levels 411, 413, and 415. In this example, during power-on sequence 406, both total amount of power 418 and final amount of power 420 may not exceed maximum power limit 402 of information handling system 300, such that the power-on sequence does not cause a shutdown of the information handling system. Therefore, based on BMC 312 directing controller 320, via memory map 322, to utilize power-on sequence 406 of devices 314, 316, and 318, total amount of inrush power-on power 418 does not exceed the maximum power limit 402 of information handling system 300.

Referring back to FIG. 3, in response to all devices 314, 316, and 318 receiving power, BMC 312 may release a platform/PCIe reset signal to enable information handling system 300 to operate in a runtime operation. During the runtime operation, the power brake signals may be utilized, in any suitable manner, as power throttling signals for devices 314, 316, and 318. In an example, the power brake signals may be utilized for power throttling as described below with respect to FIGS. 5, 6, and 7.

In an additional or alternative example, controller 320 may further control the release of the power brake signals for devices 314, 316, and 318 in any suitable manner to control a soft start of information handling system 300. For example, controller 320 may utilize a pulse width modulated (PWM) power brake signal during the release of a power brake signal for a device. In an example, controller 320 may provide a PWM power brake signal on power brake line 342, and the controller may decrease the duty cycle of the PWM power brake signal provided to device 316 from 100% to 0% over any suitable amount of time, such that the power brake signal is released when the duty cycle is 0%. At duty cycle of 100%, the power brake signal is provided the entire time. In an example, the power brake PWM at 100% causes the device to be gated power. In response to the expiration of the amount of time associated with device 316 to settle to the final power level, controller 320 may decrease the duty cycle of the PWM power brake signal provided to device 318 from 100% to 0% over any suitable amount of time. Similarly, in response to the expiration of the amount of time associated with device 318 to settle to the final power level, controller 320 may decrease the duty cycle of the PWM power brake signal provided to device 314 from 100% to 0% over any suitable amount of time.

In an additional or alternative example, BMC 312 may further control the power-on of devices 314, 316, and 318 in any suitable manner to control the in-rush current of the devices. For example, controller 320 may utilize a PWM power-on control signal after the release of a power brake signal for a device. In an example, in response to the release of power brake signal on power brake line 342, BMC 312 may provide a PWM power-on control signal to device 316. BMC 312 may increase the duty cycle of the PWM power-on control signal provided to device 316 from 0% to 100% over any suitable amount of time, such that the in-rush current drawn by the device is decreased as compared to immediately providing a power signal that is fully turned on. In response to the release of power brake signal on power brake line 344, BMC 312 may provide a PWM power-on control signal to device 318. BMC 312 may increase the duty cycle of the PWM power-on control signal provided to device 318 from 0% to 100% over any suitable amount of time, such that the in-rush current drawn by the device is controlled. Similarly, in response to the release of power brake signal on power brake line 340, BMC 312 may provide a PWM power-on control signal to device 314. BMC 312 may increase the duty cycle of the PWM power-on control signal provided to device 314 from 0% to 100% over any suitable amount of time, such that the in-rush current drawn by the device is decreased.

Figure 5:
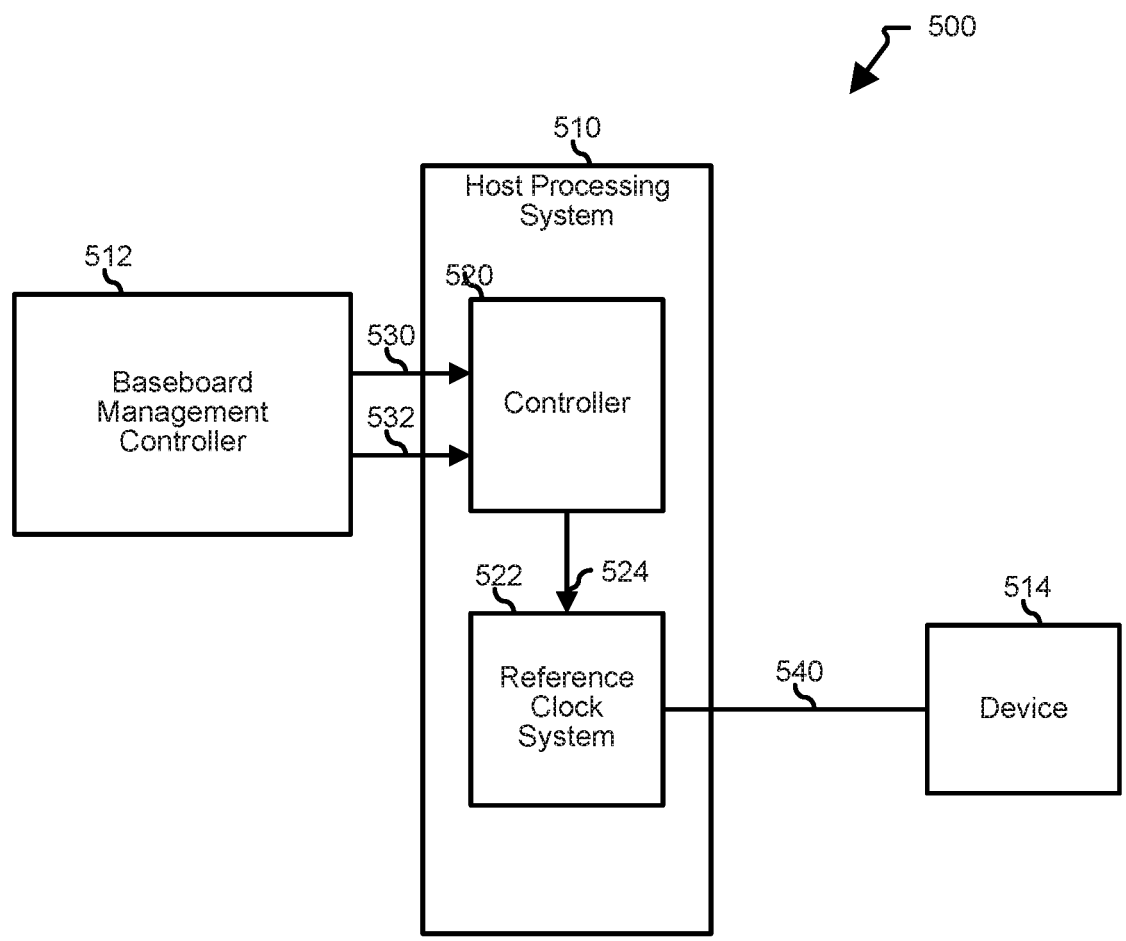
FIG. 5 is a block diagram of a portion of an information handling system according to at least one embodiment of the disclosure.

FIG. 5 is a block diagram of a portion of an information handling system 500 including a host processing system 510, a BMC 512, and a device 514 according to at least one embodiment of the disclosure. Host processing system 510 includes a controller 520 and a reference clock system 522. In an example, BMC 512 may be any suitable type of controller, such as a BMC in accordance with an IPMI specification, an Integrated Dell Remote Access Controller (iDRAC), or the like. In an embodiment, BMC 512 is BMC 312 of FIG. 3, such that information handling system 500 is substantially similar to information handling system 300 of FIG. 3. In an example, controller 520 may be any suitable device to control a power throttling of one or more devices, such as device 514, within information handling system 500. For example, controller 520 may be a CPLD.

In an example, controller 520 may control the power throttling of any suitable device including, but not limited to, a network interface card (NIC), a graphics processing unit (GPU), a PCIe device, and a FGPA accelerator. In an example, device 514 may be, or may be substantially similar to, devices 314, 316, and 318 of FIG. 3, FPGAs 124 and 126 of FIG. 1, or FPGA add-in card 200 of FIG. 2. Information handling system 500 may include additional components (not shown in FIG. 5), without varying from the scope of this disclosure. For example, information handling system 500 may include additional devices to power throttle without varying from the scope of this disclosure. Additionally, in an example, information handling system 500 may be incorporated within information handling system 100 of FIG. 1, such that controller 520 may power throttle FPGAs 124 and 126 of FIG. 1.

During operation of information handling system 500, device 514 may, at any given point in time, consume a very high amount of power that may exceed the thermal and power rating of information handling system 500 and damage the hardware. In this example, if device 514 starts to consume an even higher amount of power, such as over 300W, information handling system 500 may encounter a power loss event and cause system shutdown unless the device is quickly power throttled to reduce the amount of power consumed by the device. Thus, BMC 512 and controller 520 may utilize reference clock system 522 to power throttle device 514 via a power brake signal to prevent damage to information handling system 500. In an example, BMC 512 may also utilize a signal on a system management bus (SMBus) to control power throttling in device 514.

BMC 512 may monitor the power consumption and thermal output of device 514, and determine whether the device should be throttled, such that the power consumption and/or heat produced by the device are reduced. However, device 514 may be any suitable device including, but not limited to, an FPGA, that has specific clocking requirements, such that the device may not receive the power brake signal directly without the running clock of the device being disrupted. Thus, BMC 512 may utilize controller 520 and reference clock system 522 to throttle device 514. In an example, BMC 512 may provide a power brake request to controller 520 via a power brake request signal on power brake line 530. In another example, BMC 512 may provide the power brake request to controller 520 via a signal on SMBus 532.

In response to receiving the power brake request, controller 520 may acknowledge the request and send a command to reference clock system 522 via a communication line 524. In an example, communication line 524 may be any suitable type of communication line including, but not limited to, a SMBus. In response to receiving the command, reference clock system 522 may select a lower frequency clock output for device 514 and provide the lower frequency clock output to the device via reference clock line 540. In an embodiment, the lower frequency clock output causes device 514 to operate at a slower speed, which in turn causes the device to arrive at a lower power consumption. Thereby, device 514 may reduce its power consumption and heat output.

In an example, reference clock system 522 may perform one or more operations to create a clean transition of the reference clock output to device 514 from one frequency to another. For example, reference clock system 522 may determine a transition time window that the transition of the reference clock signal from one frequency to another may be performed without effecting the operation of device 514.

Additionally, reference clock system 522 may determine a lowest frequency that device 514 may operate at based on the internal logic design of the device. For example, reference clock system 522 may ensure that the timing requirements are met at a given frequency. Reference clock system 522 may enable power throttling of device 514 without disrupting the operation of the device based on a seamless transition of the reference clock signal from one frequency to another in response to the command from controller 520.

In an additional or alternative example, reference clock system 522 may select and provide a lower frequency reference clock signal to more than one device via different reference clock signal being provided on different reference clock lines for the different devices. In this example, reference clock system 522 may select the device that the reference clock signal is provided via any suitable means including, but not limited to, selection circuitry within the reference clock system and selection circuity outside the reference clock system.

In an additional or alternative example, host processing system 510 may include multiple reference clock systems, such that each reference clock system may control the frequency of a reference clock signal provided to a different device.

Figure 6:
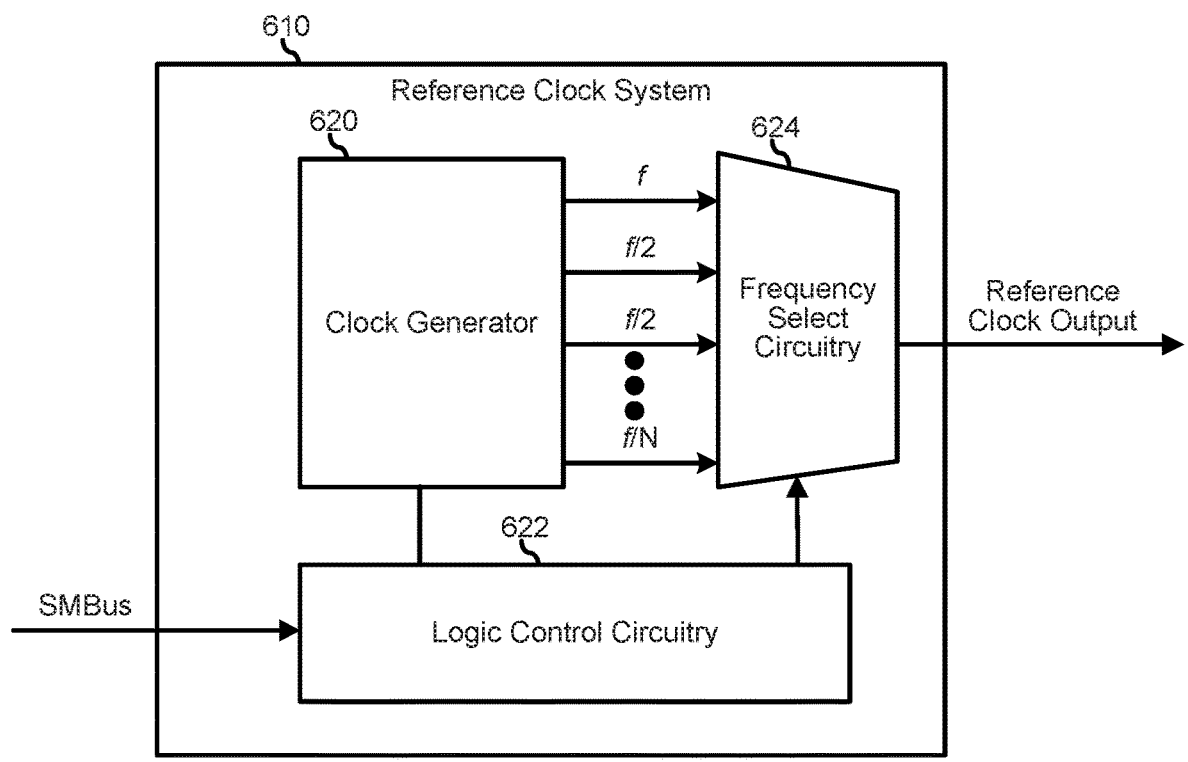
FIG. 6 is a block diagram of an exemplary reference clock system of the information handling system of FIG. 5 according to at least one embodiment of the disclosure.

FIG. 6 is a schematic diagram of reference clock system 610 according to at least one embodiment of the disclosure. In an embodiment, reference clock system 610 details the circuitry within reference clock system 522 of FIG. 5. Reference clock system 610 includes a clock generator 620, logic control circuitry 622, and a frequency select circuitry 624. Reference clock system 610 may include additional components (not shown in FIG. 6), without varying from the scope of this disclosure.

During runtime of an information handling system, a power brake signal may be utilized to control power throttling of a device, such as device 514 of FIG. 5. In an example, reference clock system 610 may receive a command signal from any suitable controller, such as BMC 512 or controller 520 of FIG. 5, and the command signal may indicate that the frequency of a reference clock signal should be reduced. In an example, reference clock system 610 may receive the command signal via a SMBus coupled to logic control circuitry 622 or any other means of control communication that's known in the art. In one example, it could be a General Purpose Input (GPI) signal.

Based on the reception of the command signal, logic control circuitry 622 may perform one or more operations to reduce the frequency of the reference clock provided on the reference clock output of reference clock system 610. For example, logic control circuitry 622 may cause clock generator 620 to generate multiple reference clock signals, and each reference clock signal output by the clock generator may have a different frequency as shown in FIG. 6. Frequency select circuitry 624 may include multiple input terminals, and each input terminal may receive a different reference clock signal from clock generator 620. Logic control circuitry 622 may determine a time to transition the frequency of the reference clock signal from a first frequency to a second frequency. Based on the determined time, logic control circuitry 622 may provide a control signal to frequency select circuity 624 during the determined time to cause a seamless transition of the frequency of the reference clock signal on the reference clock output line. In an example, logic control circuitry 622 may receive the current reference clock signal to determine the time to transition the frequency based on transitions between high and low voltage levels in the current reference clock signal. Transitioning of the frequency of the reference clock signal will be described with respect to FIG. 7.

Figure 7:
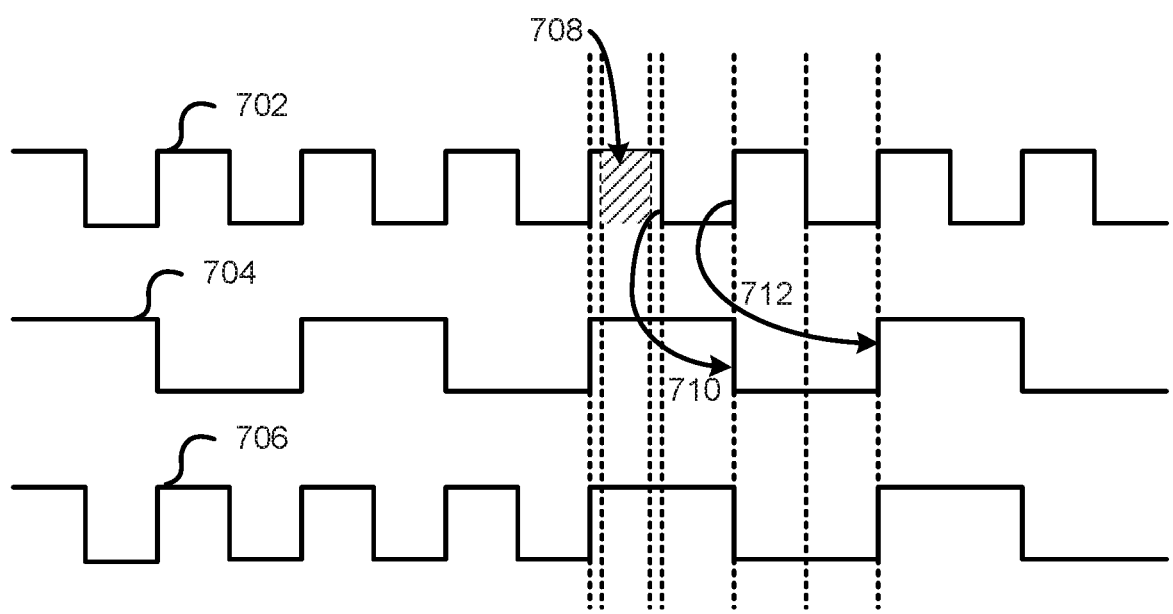
FIG. 7 is a diagram showing a group of signals associated with the reference clock system of FIG. 6 according to at least one embodiment of the disclosure.

FIG. 7 illustrates waveforms 702, 704, 706 associated with reference clock system 610 of FIG. 6 according to at least one embodiment of the disclosure. Waveform 702 represents a clock signal having a first frequency. Waveform 704 represents a clock signal having a second frequency, and waveform 706 represents a reference clock output signal. In an example, the clock signal represented by waveform 704 may have a frequency that is half the frequency of the clock signal represented by waveform 702.

In an example, the frequency of the current reference clock output signal, represented by waveform 706, may start as the same frequency as the first clock signal, represented by waveform 702. In response to a transition command from a controller, such as controller 520 of FIG. 5, a reference clock system, such as reference clock 522 of FIG. 5 or 610 of FIG. 6, determines a transition window time 708 to transition the reference clock output signal to a second frequency. In an example, transition window time 708 may be a period of time that the frequency of the reference clock signal may transition to another frequency without causing problems in the logic of a device receiving the reference clock signal. For example, a start time of transition window time 708 may be defined as a period of time that is a predefined amount of time after a transition from a low voltage level to a high voltage level of the clock signal, represented by waveform 702, and being provided as the reference clock signal, represented by waveform 706. Additionally, end time of transition window time 708 may be defined by a period of time that ends a predefined amount of time before a next transition from the high voltage level to a low voltage level of the original clock signal.

In response to determining transition window time 708 and during the transition window time, control logic circuity 622 may send a signal to frequency select circuitry 624. The signal may indicate that the reference clock, represented by waveform 706, should be transitioned from the first clock signal, represented by waveform 702, to the second clock signal, represented by waveform 704. In this situation, the transition from a high voltage level to a low voltage level for the reference clock signal may be changed from the transition in waveform 702 to the transition in waveform 704 as shown by arrow 710. Similarly, the next transition from a low voltage level to a high voltage level for the reference clock signal may be changed from the transition in waveform 702 to the transition in waveform 704 as shown by arrow 712. Thus, the transition between frequencies for the reference clock signal, waveform 706, may be seamless so that the core logic in the device is not disrupted.

Referring back to FIG. 6, logic control circuitry 622 may provide the control signal to frequency select circuitry 624 during transition time window to enable the frequency transition to be seamless, and to not cause logic problems within the device.

In alternative examples, reference clock system 610 may be implemented in any other suitable manner including, but not limited to, device select circuitry being located within reference clock system 610 to select a device to provide the reference clock output, and device select circuitry being located outside of reference clock system 610 to select a device to provide the reference clock output. In an example, device select circuity may receive a single clock signal from frequency select circuitry 624 and may provide the clock signal to one of multiple different devices based on a control signal provided to the device select circuitry.

Figure 8:
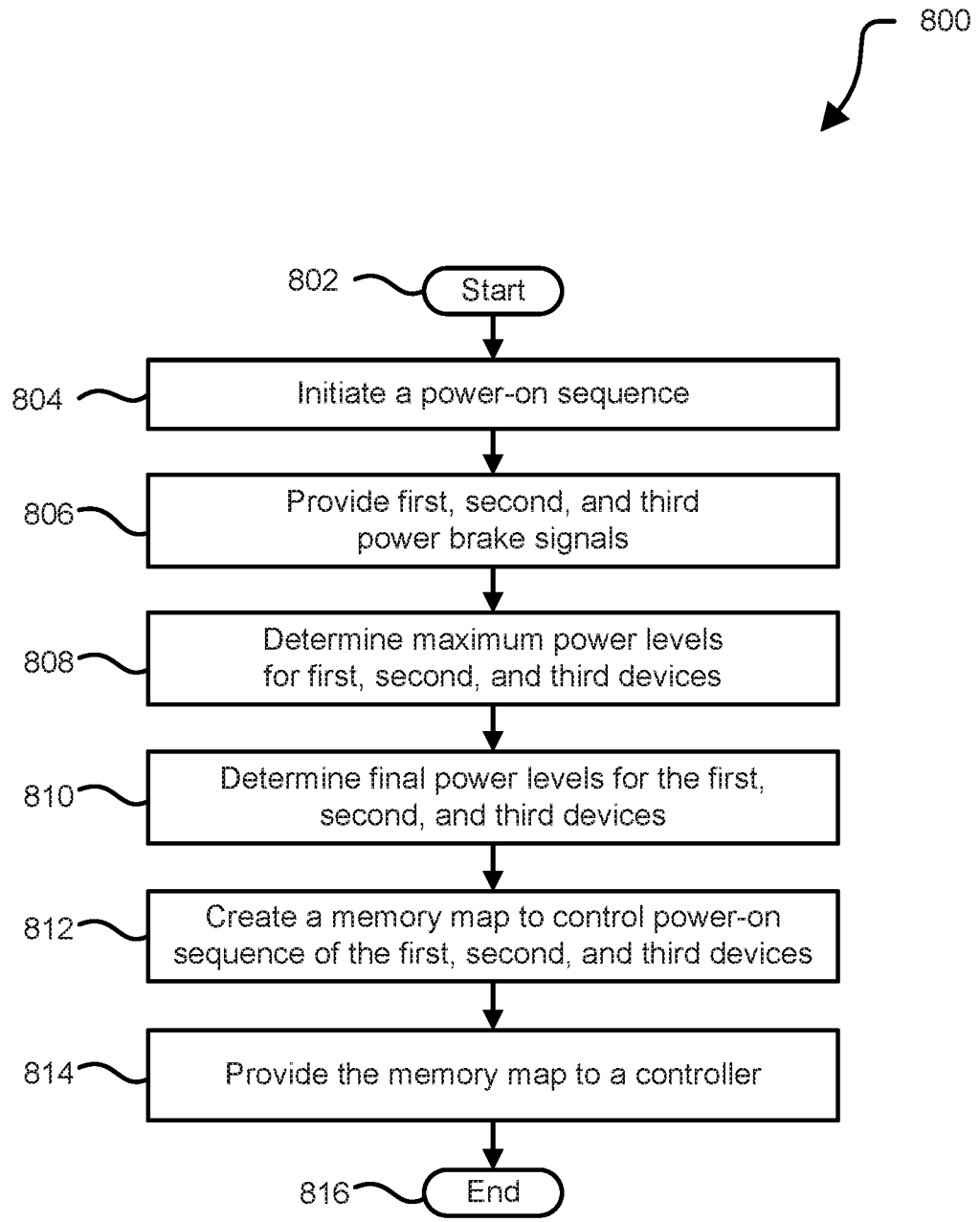
FIG. 8 is a flow diagram illustrating a method for creating and providing a memory map for controlling power brake signals in an information handling system according to at least one embodiment of the disclosure.

FIG. 8 is a flow diagram illustrating a method 800 for creating and providing a memory map for controlling power brake signals in an information handling system, starting at block 802. It will be readily appreciated that not every method step set forth in this flow diagram is always necessary, and that certain steps of the methods can be combined, performed simultaneously, in a different order, or perhaps omitted, without varying from the scope of the disclosure. At block 804, a power-on sequence of an information handling system is initiated. For example, a BMC within the information handling system may provide one or more signals to initiate the power-on sequence. At block 806, first, second and third power brake signals are provided to respective first, second, and third devices. For example, the BMC may utilize a controller to provide the first, second, and third power brake signals. In an example, the controller may be any suitable type of device including, but not limited to, a complex programmable logic device (CPLD). In an embodiment, the power brake signals are utilized as power gating signals for the devices during the power-on sequence.

At block 808, maximum in-rush power levels for the first, second, and third devices are determined. In an example, each of the first, second, and third devices may have a different maximum in-rush power level. In an embodiment, the maximum in-rush power level is the power level of the power consumed by a particular device while an in-rush current is drawn by the device during the power-on sequence. At block 810, final power levels for the first, second, and third devices are determined. In an example, each of the first, second, and third devices may have a different final power level. In an embodiment, the final power level for a device is a power level of the power consumed during runtime of the device, and the final power level for a device is lower than the maximum in-rush power level.

At block 812, a memory map is created to control power-on sequences of the first, second, and third devices. In an example, the memory map may include particular amounts of time to wait between releasing power brake signals provided to the devices. In an embodiment, a particular amount of time associated with a specific device is the amount of time that expires between when the power brake signal is released for the device and the device settles to the final power level. At block 814, the memory map is provided to a controller, and the method ends at block 816.

Figure 9:
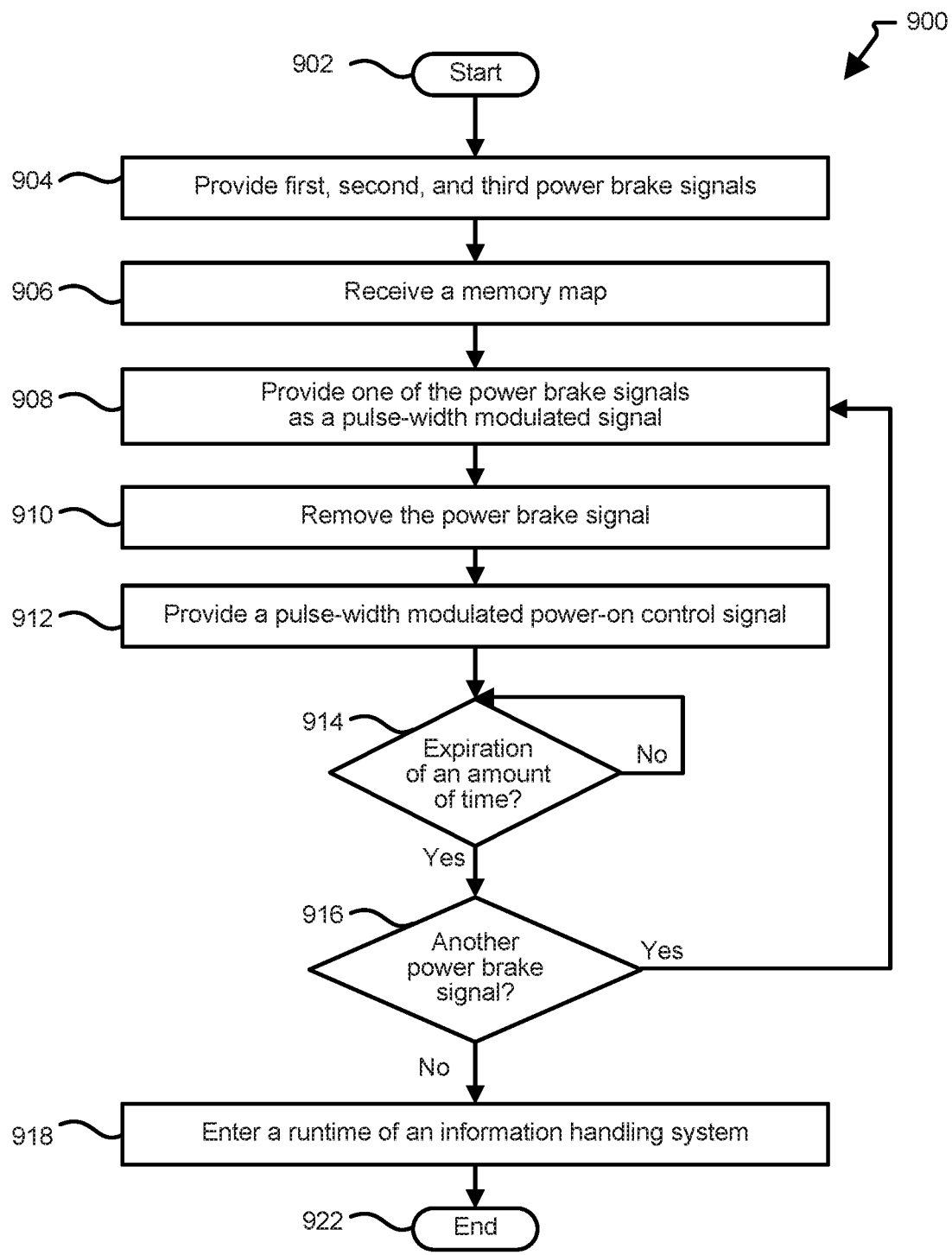
FIG. 9 is a flow diagram illustrating a method for controlling a power-on sequence of devices within an information handling system according to at least one embodiment of the disclosure.

FIG. 9 is a flow diagram illustrating a method 900 for controlling a power-on sequence of devices within an information handling system, starting at block 902. It will be readily appreciated that not every method step set forth in this flow diagram is always necessary, and that certain steps of the methods can be combined, performed simultaneously, in a different order, or perhaps omitted, without varying from the scope of the disclosure.

At block 904, first, second and third power brake signals are provided to respective first, second, and third devices. For example, the BMC may utilize a controller to provide the first, second, and third power brake signals. In an example, the controller may be any suitable type of device including, but not limited to, a complex programmable logic device (CPLD). In an embodiment, the power brake signals are utilized as power gating signals for the devices during the power-on sequence.

At block 906, a memory map is received. In an embodiment, the controller receives the memory map from a BMC. In an example, the memory map may include particular amounts of time to wait between releasing power brake signals provided to the devices. In an embodiment, a particular amount of time associated with a specific device is the amount of time that expires between when the power brake signal is released for the device and the device settles to the final power level.

At block 908, one of the power brake signals is provided as a pulse-width (PWM) modulated signal. In an example, the PWM power brake signal may have a decreasing duty cycle, and the duty cycle may decrease from 100% to 0%. At duty cycle of 100%, the power brake signal is provided the entire time. In an example, the power brake PWM at 100% causes the device to be gated power. At block 910, the power brake signal is removed or released. In an example, the removal/release of the power brake signal may end power gating within the device associated with the power brake signal. At block 912, a PWM power-on control signal is provided to the device. In an example, the PWM power-on control signal may have an increasing duty cycle, and the duty cycle may increase from 0% to 100%. In an embodiment, the increasing PWM power-on control signal extends an amount of time that the device is powering up, and thereby reduces the in-rush current drawn by the device.

At block 914, a determination is made whether an amount of time has expired. In an example, the amount of time may be associated with a specific device, which may be the amount of time that expires between when the power brake signal is released for the device and when the device settles to the final power level. In response to the expiration of the amount of time, a determination is made whether another power brake signal listed in the memory map is still being provided to its associated device at block 916. In response to another power brake signal still being provided, the flow continues at described above at block 908. Otherwise, if there is not another power brake signal being provided, a runtime of the information handling system is entered at block 918 and the method ends at block 922.

Figure 10:
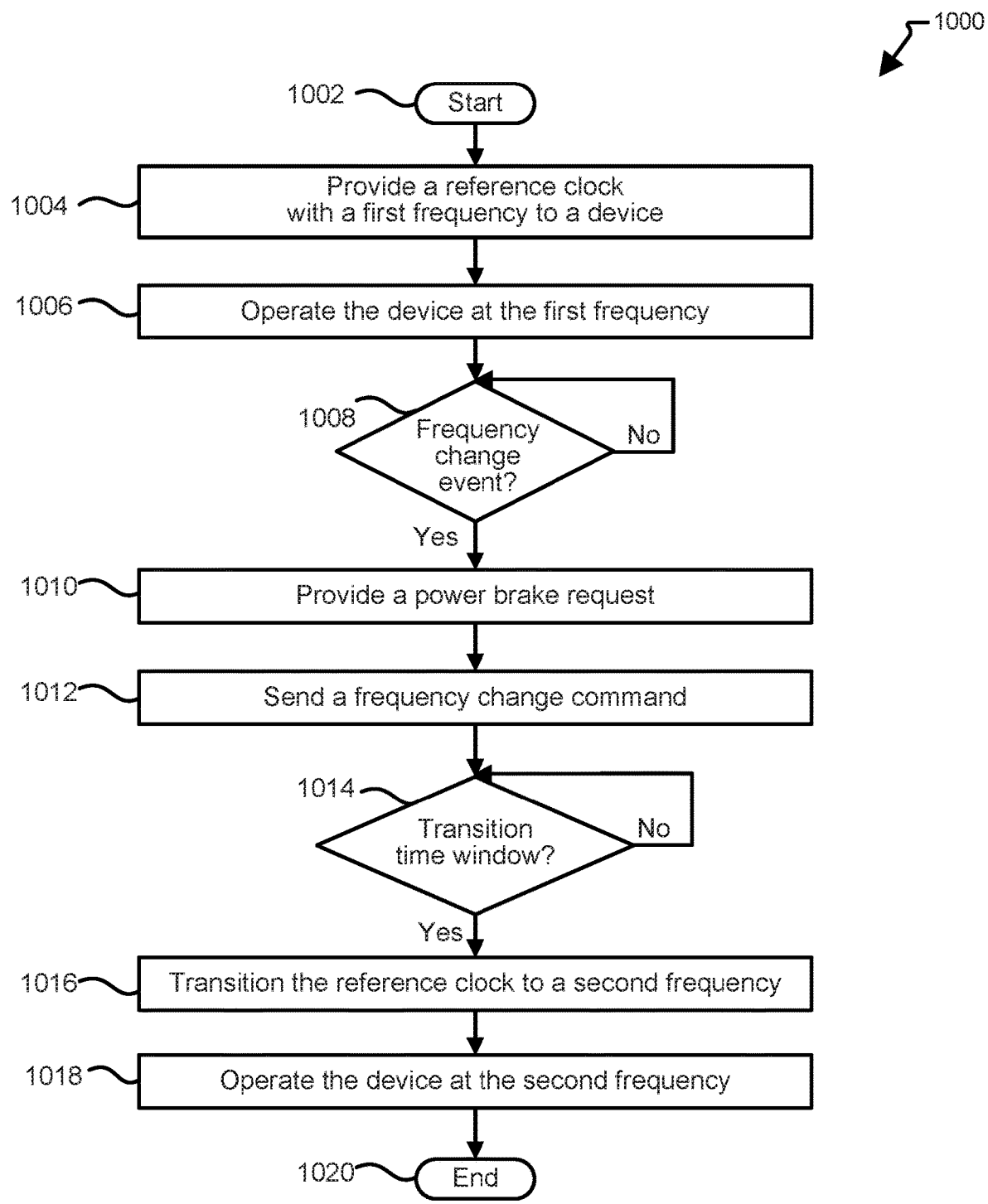
FIG. 10 is a flow diagram illustrating a method for utilizing a power brake signal to control power throttling in a device according to at least one embodiment of the disclosure.

FIG. 10 is a flow diagram illustrating a method 1000 for utilizing a power brake signal to control power throttling in a device, starting at block 1002. It will be readily appreciated that not every method step set forth in this flow diagram is always necessary, and that certain steps of the methods can be combined, performed simultaneously, in a different order, or perhaps omitted, without varying from the scope of the disclosure.

At block 1004, a reference clock with a first frequency is provided to a device. In an example, a reference clock system may provide the reference clock to the device. In an embodiment, the device is an FPGA device. At block 1006, the device is operated at the first frequency. In an example, the logic components within the device may operate based on the frequency of the reference clock. At block 1008, a determination is made whether a frequency change event has been detected. In an example, the frequency change event may be any suitable event including, but not limited to, detection of high inrush power consumption by the device and a large amount of heat being produced by the device.

In response to a frequency change event being detected, a power brake request is provided at block 1010. In an example, a BMC may provide the power brake request to a controller of the information handling system, via a power brake line, a SMBus, or the like. At block 1012, a frequency change command is sent. In an example, the controller may send the frequency change command to the reference clock system via any suitable communication line including, but not limited to, a SMBus. At block 1014, a determination is made whether a transition time window has been detected. In an example, the transition time window may be a window of time within a current reference clock that may enable a transition from a first frequency to a second frequency to be seamless, and not disrupt core logic within the device.

In response to the transition time window being detected, the reference clock is transitioned to a second frequency at block 1016. In an example, the second frequency may be a lower frequency than the first frequency. At block 1018, the device is operated at the second frequency, and the method ends at block 1020.

Figure 11:
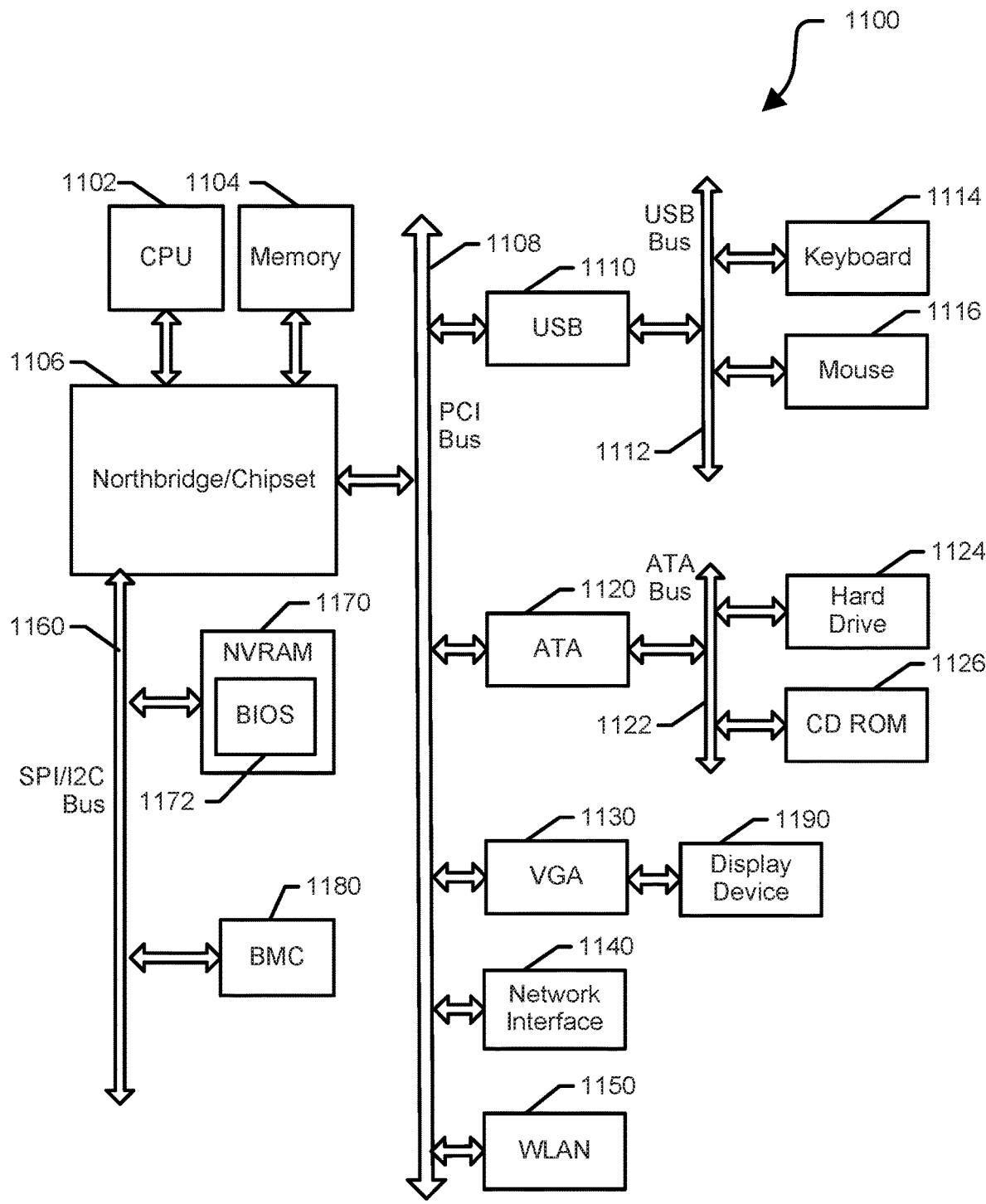
FIG. 11 is a block diagram of a general information handling system according to at least one embodiment of the disclosure.

FIG. 11 illustrates a general information handling system 1100 including a processor 1102, a memory 1104, a northbridge/chipset 1106, a PCI bus 1108, a universal serial bus (USB) controller 1110, a USB bus 1112, a keyboard device controller 1114, a mouse device controller 1116, a configuration ATA bus controller 1120, an ATA bus 1122, a hard drive device controller 1124, a compact disk read only memory (CD ROM) device controller 1126, a video graphics array (VGA) device controller 1130, a network interface controller (NIC) 1140, a wireless local area network (WLAN) controller 1150, a serial peripheral interface (SPI) bus 1160, a NVRAM 1170 for storing BIOS 1172, and a baseboard management controller (BMC) 1180. In an embodiment, information handling system 1100 may be information handling system 100 of FIG. 1, information handling system 200 of FIG. 2, information handling system 300 of FIG. 3. BMC 1180 can be referred to as a service processor or embedded controller (EC). Capabilities and functions provided by BMC 1180 can vary considerably based on the type of information handling system. For example, the term baseboard management controller is often used to describe an embedded processor included at a server, while an embedded controller is more likely to be found in a consumer-level device. As disclosed herein, BMC 1180 represents a processing device different from CPU 1102, which provides various management functions for information handling system 1100. For example, an embedded controller may be responsible for power management, cooling management, and the like. An embedded controller included at a data storage system can be referred to as a storage enclosure processor.

For purpose of this disclosure information handling system 1100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 1100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 1100 can include processing resources for executing machine-executable code, such as CPU 1102, a programmable logic array (PLA), an embedded device such as a System-on-a-Chip (SoC), or other control logic hardware. Information handling system 1100 can also include one or more computer-readable medium for storing machine-executable code, such as software or data.

System 1100 can include additional processors that are configured to provide localized or specific control functions, such as a battery management controller. Bus 1160 can include one or more busses, including a SPI bus, an I2C bus, a system management bus (SMBUS), a power management bus (PMBUS), and the like. BMC 1180 can be configured to provide out-of-band access to devices at information handling system 1100. As used herein, out-of-band access herein refers to operations performed prior to execution of BIOS 1172 by processor 1102 to initialize operation of system 1100.

BIOS 1172 can be referred to as a firmware image, and the term BIOS is herein used interchangeably with the term firmware image, or simply firmware. BIOS 1172 includes instructions executable by CPU 1102 to initialize and test the hardware components of system 1100, and to load a boot loader or an operating system (OS) from a mass storage device. BIOS 1172 additionally provides an abstraction layer for the hardware, such as a consistent way for application programs and operating systems to interact with the keyboard, display, and other input/output devices. When power is first applied to information handling system 1100, the system begins a sequence of initialization procedures. During the initialization sequence, also referred to as a boot sequence, components of system 1100 are configured and enabled for operation, and device drivers can be installed. Device drivers provide an interface through which other components of the system 1100 can communicate with a corresponding device.

Information handling system 1100 can include additional components and additional busses, not shown for clarity. For example, system 1100 can include multiple processor cores, audio devices, and the like. While a particular arrangement of bus technologies and interconnections is illustrated for the purpose of example, one of ordinary skill in the art will appreciate that the techniques disclosed herein are applicable to other system architectures. System 1100 can include multiple CPUs and redundant bus controllers. One or more components can be integrated together. For example, portions of northbridge/chipset 1106 can be integrated within CPU 1102. Additional components of information handling system 1100 can include one or more storage devices that can store machine-executable code, one or more communications ports for communicating with external devices, and various input and output (I/O) devices, such as a keyboard, a mouse, and a video display. For example, device controller 1130 may provide data to a display device 1190 to visually present the information to an individual associated with information handling system 1100. An example of information handling system 1100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 1100 can include a set of instructions that can be executed to cause the information handling system to perform any one or more of the methods or computer based functions disclosed herein. The information handling system 1100 may operate as a standalone device or may be connected to other computer systems or peripheral devices, such as by a network.

In a networked deployment, the information handling system 1100 may operate in the capacity of a server or as a client user computer in a server-client user network environment, or as a peer computer system in a peer-to-peer (or distributed) network environment. The information handling system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single information handling system 1100 is illustrated, the term "system" shall also be taken to include any collection of systems or sub-systems that individually or jointly execute a set, or multiple sets, of instructions to perform one or more computer functions.

The information handling system 1100 can include a disk drive unit and may include a computer-readable medium, not shown in FIG. 11, in which one or more sets of instructions, such as software, can be embedded. Further, the instructions may embody one or more of the methods or logic as described herein. In a particular embodiment, the instructions may reside completely, or at least partially, within system memory 1104 or another memory included at system 1100, and/or within the processor 1102 during execution by the information handling system 1100. The system memory 1104 and the processor 1102 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:

first, second, and third devices configured to power-on during a power-on sequence of the information handling system; and a controller circuit to communicate with each of the devices, wherein during the power-on sequence of the information handling system the controller circuit is configured to:

provide a first power brake signal to the first device via a first power brake line, a second power brake signal to the second device via a second power brake line, and a third power brake signal to the third device via a third power brake line;

provide the first power brake signal as a pulse-width modulated power brake signal, wherein a duty cycle of the pulse-width modulated power brake signal reduces over time;

remove the first power brake signal from the first power brake line, wherein the removal of the first power brake signal enables the first device to power-on;

in response to an expiration of a first amount of time, remove the second power brake signal from the second power brake line, wherein the removal of the second power brake signal enables the second device to power-on; and in response to an expiration of a second amount of time, remove the third power brake signal from the third power brake line, wherein the removal of the third power brake signal enables the third device to power-on.

2. The information handling system of claim 1, during a runtime of the information handling system, the hardware controller device to:
provide, via the first power brake line, the first power brake signal to the first device, wherein the first power brake signal enables power throttling of the first device during the runtime of the information handling system.

3. The information handling system of claim 1, further comprising:
a baseboard management controller to communicate with the controller circuit, the baseboard management controller to:
determine a first maximum power level for the first device, a second maximum power level for the second device, and a third maximum power level for the third device;
determine a first final power level for the first device, a second final power level for the second device, and a third final power level for the third device;
create a memory map including the first amount of time and the second amount of time; and
provide the memory map to the controller circuit for control of the first, second, and third power brake signals.

4. The information handling system of claim 3, wherein a combination of the first maximum power level, the second maximum power level, and the third maximum power level exceeds a power limit for the information handling system.

5. The information handling system of claim 4, wherein a combination of the first final power level, the second final power level, and the third final power level is below the power limit for the information handling system.

6. The information handling system of claim 5, wherein a power level of the first device spikes to the first maximum power level prior to the expiration of the first amount of time, and drops to a first final power level prior to the expiration of the first amount of time.

7. The information handling system of claim 1, in response to the removal of the first power brake, the controller circuit further to:
provide a pulse-width modulated power-on control signal to the first device, wherein a duty cycle of pulse-width modulated power-on control signal increases over time.

8. A method, comprising:
during a power-on sequence of an information handling system:
providing, via a first power brake line of a controller circuit of the information handling system, a first power brake signal to a first device of the information handling system;
providing, via a second power brake line of the controller circuit, a second power brake signal to a second device of the information handling system;
providing, via a third power brake line of the controller circuit, a third power brake signal to a third device of the information handling system;
removing the first power brake signal from the first power brake line, wherein the removal of the first power brake signal enables the first device to power-on;
in response to the removing of the first power brake, providing a pulse-width modulated power-on control signal to the first device, wherein a duty cycle of pulse-width modulated power-on control signal increases over time;
in response to an expiration of a first amount of time, removing the second power brake signal from the second power brake line, wherein the removal of the second power brake signal enables the second device to power-on; and
in response to an expiration of a second amount of time, removing the third power brake signal from the third power brake line, wherein the removal of the third power brake signal enables the third device to power-on.

9. The method of claim 8, wherein prior to the removal of the first power brake signal:
providing the first power brake signal as a pulse-width modulated power brake signal, wherein a duty cycle of the pulse-width modulated power brake signal reduces over time.

10. The method of claim 8, further comprising:
during a runtime of the information handling system:
providing, via the first power brake line, the first power brake signal to the first device, wherein the first power brake signal enables power throttling of the first device during the runtime of the information handling system.

11. The method of claim 8, further comprising:
while providing all of the first, second, and third power brake signals:
determining, by a baseboard management controller, a first maximum power level for the first device, a second maximum power level for the second device, and a third maximum power level for the third device;
determining, by the baseboard management controller, a first final power level for the first device, a second final power level for the second device, and a third final power level for the third device;
creating, by the baseboard management controller, a memory map including the first amount of time and the second amount of time; and
providing, by the baseboard management controller, the memory map to the controller circuit for control of the first, second, and third power brake signals.

12. The method of claim 11, wherein a combination of the first maximum power level, the second maximum power level, and the third maximum power level exceeds a power limit for the information handling system.

13. The method of claim 12, wherein a combination of the first final power level, the second final power level, and the third final power level is below the power limit for the information handling system.

14. The method of claim 13, wherein a power level of the first device spikes to the first maximum power level prior to the expiration of the first amount of time, and drops to a first final power level prior to the expiration of the first amount of time.

15. A method, comprising:
during a power-on sequence of an information handling system:
providing, via a first power brake line of a controller circuit of the information handling system, a first power brake signal to a first device of the information handling system;
providing, via a second power brake line of the controller circuit, a second power brake signal to a second device of the information handling system;

providing, via a third power brake line of the controller circuit, a third power brake signal to a third device of the information handling system;

removing the first power brake signal from the first power brake line, wherein the removal of the first power brake signal enables the first device to power-on;

in response to the removing of the first power brake, providing a pulse-width modulated power-on control signal to the first device, wherein a duty cycle of pulse-width modulated power-on control signal increases over time;

in response to an expiration of a first amount of time, removing the second power brake signal from the second power brake line, wherein the removal of the second power brake signal enables the second device to power-on;

in response to an expiration of a second amount of time, removing the third power brake signal from the third power brake line, wherein the removal of the third power brake signal enables the third device to power-on; and during a runtime of the information handling system, providing, via the first power brake line, the first power brake signal to the first device, wherein the first power brake signal enables power throttling of the first device during the runtime of the information handling system.

16. The method of claim 15, wherein prior to the removal of the first power brake signal:

providing the first power brake signal as a pulse-width modulated power brake signal, wherein a duty cycle of the pulse-width modulated power brake signal reduces over time.

17. The method of claim 15, further comprising:

while providing all of the first, second, and third power brake signals:

determining, by a baseboard management controller, a first maximum power level for the first device, a second maximum power level for the second device, and a third maximum power level for the third device;

determining, by the baseboard management controller, a first final power level for the first device, a second final power level for the second device, and a third final power level for the third device;

creating, by the baseboard management controller, a memory map including the first amount of time and the second amount of time; and providing, by the baseboard management controller, the memory map to the controller circuit for control of the first, second, and third power brake signals.

18. The method of claim 17, wherein a power level of the first device spikes to the first maximum power level prior to the expiration of the first amount of time, and drops to a first final power level prior to the expiration of the first amount of time.

* * * * *

UNITED STATES PATENT AND TRADEMARK OFFICE
CERTIFICATE OF CORRECTION

PATENT NO. : 11,243,592 B2  
APPLICATION NO. : 16/542080  
DATED : February 8, 2022  
INVENTOR(S) : Johan Rahardjo et al.

Page 1 of 1

It is certified that error appears in the above-identified patent and that said Letters Patent is hereby corrected as shown below:

In the Claims

Column 19, Line 7-8: Please change "the hardware controller device" to --the controller circuit--

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*